United States Patent
Wu et al.

(10) Patent No.: US 11,609,896 B2
(45) Date of Patent: Mar. 21, 2023

(54) SYSTEM, METHOD AND COMPUTER PROGRAM PRODUCT FOR MAINTAINING DATA STORED IN A DATA STRUCTURE

(71) Applicant: salesforce.com, inc., San Francisco, CA (US)

(72) Inventors: Yongsheng Wu, Redwood City, CA (US); Punit Jain, Cupertino, CA (US); Craig Weissman, San Francisco, CA (US); Scott W. Yancey, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 3 days.

(21) Appl. No.: 17/473,833

(22) Filed: Sep. 13, 2021

(65) Prior Publication Data

US 2022/0107934 A1    Apr. 7, 2022

Related U.S. Application Data

(63) Continuation of application No. 15/707,400, filed on Sep. 18, 2017, now Pat. No. 11,120,003, which is a continuation of application No. 12/977,012, filed on Dec. 22, 2010, now Pat. No. 9,767,136.

(60) Provisional application No. 61/329,040, filed on Apr. 28, 2010, provisional application No. 61/329,043, filed on Apr. 28, 2010, provisional application No. 61/319,787, filed on Mar. 31, 2010.

(51) Int. Cl.
*G06F 16/23* (2019.01)
*G06F 16/2453* (2019.01)
*G06F 16/11* (2019.01)

(52) U.S. Cl.
CPC .... *G06F 16/2343* (2019.01); *G06F 16/24549* (2019.01); *G06F 16/122* (2019.01)

(58) Field of Classification Search
CPC .............. G06F 16/2343; G06F 16/122; G06F 16/24549
See application file for complete search history.

(56) References Cited

U.S. PATENT DOCUMENTS

| | | | |
|---|---|---|---|
| 5,446,858 | A | 8/1995 | Copeland et al. |
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |

(Continued)

OTHER PUBLICATIONS

Weissman, "Programming language method and system for extending APIS to execute in conjunction with an on-demand database service," U.S. Appl. No. 60/828,192, filed Oct. 4, 2006, 66 pages.

(Continued)

*Primary Examiner* — Eliyah S. Harper
(74) *Attorney, Agent, or Firm* — Kowert, Hood, Munyon, Rankin & Goetzel, P.C.; Mark D. Seegers; Dean M. Munyon

(57) ABSTRACT

There are provided mechanisms and methods for maintaining data stored in a data structure. These mechanisms and methods for maintaining data stored in a data structure can provide maintenance operations with improved efficiency, functionality, etc.

20 Claims, 8 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,082,492 B2 | 7/2006 | Pullela et al. |
| 7,139,242 B2 | 11/2006 | Bays |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,389,293 B2 | 6/2008 | Chan et al. |
| 7,401,094 B1 | 7/2008 | Kesler |
| 7,401,196 B2 | 7/2008 | Mori et al. |
| 7,412,455 B2 | 8/2008 | Dillon |
| 7,433,943 B1 | 10/2008 | Ford |
| 7,508,789 B2 | 3/2009 | Chan |
| 7,593,942 B2 | 9/2009 | Sack et al. |
| 7,620,655 B2 | 11/2009 | Larsson et al. |
| 7,698,160 B2 | 4/2010 | Beaven et al. |
| 7,760,643 B2 | 7/2010 | Kim et al. |
| 7,770,200 B2 | 8/2010 | Brooks et al. |
| 7,779,039 B2 | 8/2010 | Weissman et al. |
| 7,802,286 B2 | 9/2010 | Brooks et al. |
| 7,877,409 B2 | 1/2011 | Lim |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 8,875,218 B2 | 10/2014 | Lim |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0117371 A1 | 6/2004 | Bhide et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2005/0289143 A1 | 12/2005 | Oshri et al. |
| 2006/0021019 A1 | 1/2006 | Hinton et al. |
| 2006/0149703 A1 | 7/2006 | Poyourow |
| 2006/0206834 A1 | 9/2006 | Fisher et al. |
| 2006/0248083 A1 | 11/2006 | Sack et al. |
| 2006/0259949 A1 | 11/2006 | Schaefer et al. |
| 2006/0271544 A1 | 11/2006 | Devarakonda et al. |
| 2006/0288046 A1 | 12/2006 | Gupta et al. |
| 2007/0156694 A1 | 7/2007 | Lim |
| 2007/0214168 A1 | 9/2007 | Sandrock et al. |
| 2008/0163380 A1* | 7/2008 | Liu ............ G06F 16/9535 726/28 |

(56) References Cited

U.S. PATENT DOCUMENTS

| | | |
|---|---|---|
| 2008/0249972 A1 | 10/2008 | Dillon |
| 2008/0263060 A1* | 10/2008 | Benantar .............. G06F 16/367 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0178106 A1* | 7/2009 | Feng ................... H04L 63/0884 |
| | | 726/1 |
| 2009/0319480 A1 | 12/2009 | Saito |
| 2010/0217853 A1* | 8/2010 | Alexander ............. H04L 63/20 |
| | | 709/223 |
| 2010/0274937 A1* | 10/2010 | Song ....................... G06F 9/526 |
| | | 710/200 |
| 2011/0131192 A1 | 6/2011 | Finnie et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jackobson et al. |
| 2015/0007050 A1 | 1/2015 | Jackobson et al. |

OTHER PUBLICATIONS

Office Action in U.S. Appl. No. 12/977,012 dated Apr. 27, 2012, 9 pages.
Office Action in U.S. Appl. No. 12/977,012 dated Oct. 5, 2012, 14 pages.
Office Action in U.S. Appl. No. 12/977,012 dated May 30, 2014, 10 pages.
Office Action in U.S. Appl. No. 12/977,012 dated Dec. 9, 2014, 9 pages.
Office Action in U.S. Appl. No. 12/977,012 dated Jun. 3, 2015, 10 pages.
Office Action in U.S. Appl. No. 12/977,012 dated Feb. 24, 2016, 12 pages.
Office Action in U.S. Appl. No. 12/977,012 dated Nov. 28, 2016, 14 pages.

* cited by examiner

SYSTEM, METHOD AND COMPUTER PROGRAM PRODUCT FOR MAINTAINING DATA STORED IN A DATA STRUCTURE

CLAIM OF PRIORITY

The present application is a continuation of U.S. application Ser. No. 15/707,400, filed Sep. 18, 2017 (now U.S. Pat. No. 11,120,003), which is a continuation of U.S. application Ser. No. 12/977,012, filed Dec. 22, 2010 (now U.S. Pat. No. 9,767,136), which claims priority to U.S. Provisional Appl. No. 61/319,787, filed Mar. 31, 2010, U.S. Provisional Appl. No. 61/329,040, filed Apr. 28, 2010, and U.S. Provisional Appl. No. 61/329,043, Apr. 28, 2010; the disclosures of each of the above-referenced applications are incorporated by reference herein in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to operations on data, and more particularly to operating on data stored in a data structure.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventionally, the data stored in a data structure has been maintained for various purposes, such as providing access to the data by users, allowing the data to be updated, etc. However, traditional techniques for maintaining data in structures have exhibited various limitations. For example, when a data structure is shared by multiple users, the entire data structure is generally locked while a change is being made to a portion of the data structure for preserving data integrity. As another example, changes desired to be made to the data in the data structure may be complex and thus may take a long time to compute, such that when there are multiple of such complex changes to be made the performance associated with the data structure may be negatively impacted. As a further example, due to the writeable nature of the data structure, methods to identify errors introduced when changes are made to the data may also negatively impact performance associated with the data structure and/or the system on which the data structure is located, particularly when there is a large amount of data within the data structure to validate.

Accordingly, it is desirable to provide improved techniques enabling maintenance of data stored in data structures to increase efficiency, functionality, etc. of operations utilized for providing such data structure maintenance.

BRIEF SUMMARY

In accordance with embodiments, there are provided mechanisms and methods for maintaining data stored in a data structure. These mechanisms and methods for maintaining data stored in a data structure can enable embodiments to provide maintenance operations with improved efficiency, functionality, etc.

In an embodiment and by way of example, a method for maintaining data stored in a data structure is provided. In one embodiment, a request to perform a first operation associated with a data structure is received. Additionally, a portion of the data structure utilized for performing the first operation is identified. Further, during performance of the first operation, at least one second operation is blocked only with respect to the portion of the data structure.

In another embodiment, a plurality of changes is applied to a first data structure. In addition, a second data structure storing data derived from the first data structure is identified. Still yet, recalculation of the second data structure is performed after the application of the plurality of changes to the first data structure.

In yet another embodiment, resource utilization of a system is determined to be below a predetermined threshold. Moreover, data stored in a data structure of the system is compared to expected data, in response to the determination. Furthermore, at least one error is identified in the data stored in the data structure, based on the comparison.

While one or more implementations and techniques are described with reference to an embodiment in which maintaining data stored in a data structure is implemented in a system having an application server providing a front end for an on-demand database service capable of supporting multiple tenants, the one or more implementations and techniques are not limited to multi-tenant databases nor deployment on application servers. Embodiments may be practiced using other database architectures. i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for maintaining data stored in a data structure.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing and maintaining data stored in a data structure will be described with reference to example embodiments.

Figure 1:
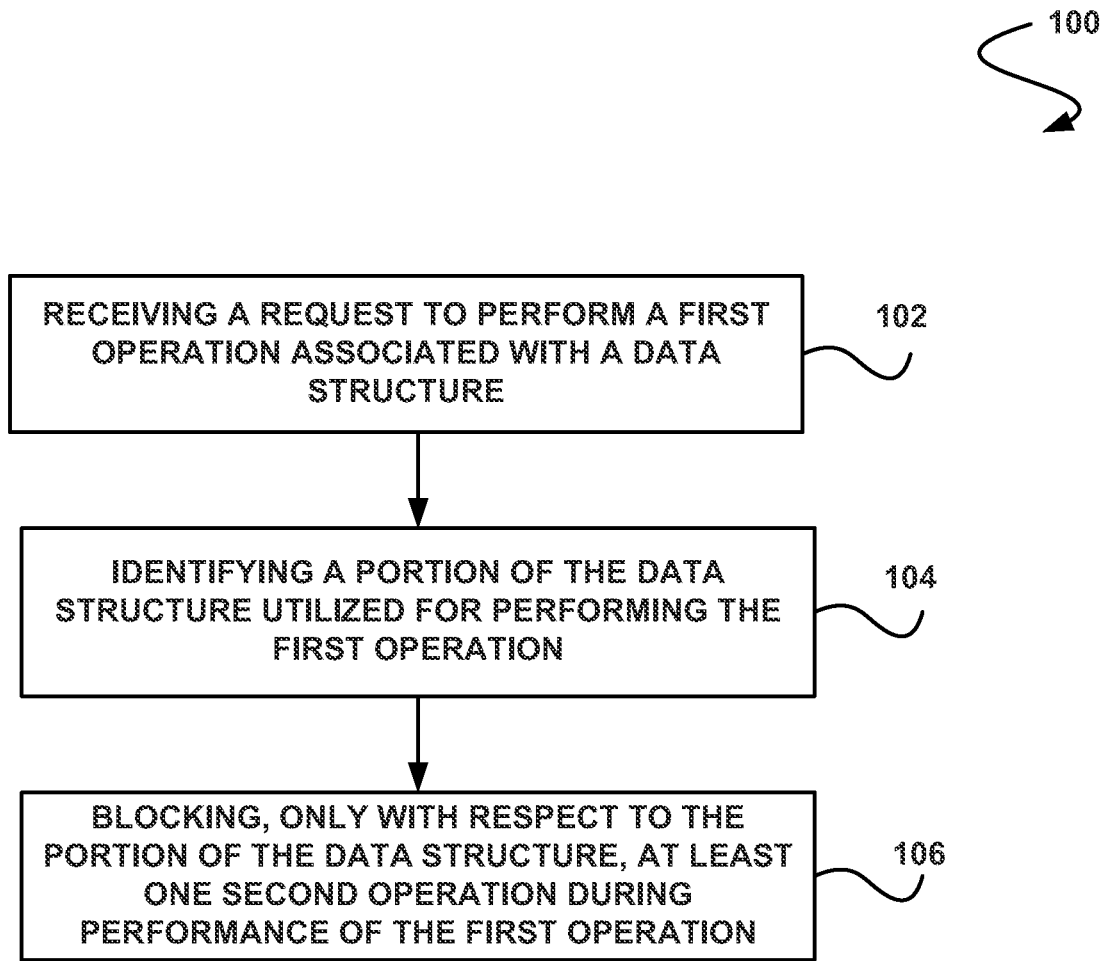
FIG. 1 illustrates a method for maintaining data stored in a data structure by blocking parallel operations from being performed on a particular portion of the data, in accordance with one embodiment.

FIG. 1 illustrates a method for maintaining data stored in a data structure by blocking parallel operations from being performed on a particular portion of the data, in accordance with one embodiment. As shown in operation 102, a request to perform a first operation associated with a data structure is received. With respect to the present description, the data structure includes any structure for storing data, such as a table, database, etc.

In one embodiment, the data structure may store group membership information, such as for each of a plurality of users that are members of the group. In another embodiment, the data structure may store content access control information, such as which content each group is permitted to access (and optionally which content a user is permitted to access where the user is given permission directly and not necessarily via a group).

Further, the first operation that is requested to be performed on the data structure may include any operation capable of being performed on at least a portion of the data stored in the data structure. For example, the first operation may include modifying the data, such as updating the data, removing the data from the data structure, etc. It should be noted that the request may be received in any context (e.g. from a user, from an application, etc.).

Additionally, as shown in operation 104, a portion of the data structure utilized for performing the first operation is identified. The portion of the data structure utilized for performing the first operation may include data within the data structure. For example, the portion of the data structure may include a particular string, value, etc. stored in the data structure.

In another embodiment, the portion of the data structure utilized for performing the first operation may include a substructure within the data structure on which the first operation may be performed. For example, the portion of the data structure may include at least one row, field, etc. of the data structure. Of course, however, the portion of the data structure utilized for performing the first operation may include any subpart of the data structure with respect to which the first operation may be performed.

Moreover, the aforementioned portion of the data structure may be identified in any desired manner. In one embodiment, the portion of the data structure may be identified based on a predetermination that the portion of the data structure is utilized for performing the first operation. For example, the operation may include a preconfigured operation, such that for each of a plurality of preconfigured operations, the portion of the data structure associated therewith may be predetermined.

In another embodiment, the portion of the data structure may be identified based on at least one parameter of the first operation. For example, the parameter may identify the portion of the data structure. Just by way of example, the first operation may indicate a row of the data structure on which it is to be performed.

Further, as shown in operation 106, during performance of the first operation, at least one second operation is blocked only with respect to the portion of the data structure. In the context of the present description, the second operation may include any operation capable of being performed with respect to the data structure. Thus, the second operation may be allowed to be performed on portions of the data structure not utilized by the first operation, but may be blocked from being performed on the portion of the data structure utilized by the first operation, the reasons for which will be set forth below.

In one embodiment, the second operation may include modifying data included in the portion of the data structure. As noted above, the first operation may include modifying a particular data in the data structure. To this end, a second operation which also modifies the same particular data may be blocked during performance of the first operation.

In another embodiment, the second operation may include applying a lock to the portion of the data structure, where the lock is utilized for blocking modifications to the portion of the data structure. For example, a first lock may be placed on the portion of the data structure in association with the first operation, for blocking other operations from being performed on the portion of the data structure during performance of the first operation. Thus, where the second operation includes application of a second lock on the portion of the data structure, the second operation, and therefore the second lock, may be blocked during performance of the first operation (e.g. while the first lock is held on the portion of the data structure). In this way, multiple locks may optionally be prevented from being held on the same portion of the data at the same time.

More examples of the types of operations (e.g. data modifications, types of locks, etc.) that may be blocked during performance of the first operation with respect to the associated portion of the data structure are provided in more detail below with respect to the description of FIG. 2. Optionally, the second operation may be blocked by applying a lock to the portion of the data structure, as described above. Where multiple types of locks are available, the type of lock applied to the portion of the data structure may be determined based on a type of the first operation, as also described in more detail below with respect to FIG. 2.

Thus, since the second operation is blocked only with respect to the portion of the data utilized for performing the first operation, the second operation may optionally be performed with respect to other portions of the data structure not necessarily utilized for performing the first operation. In this way, parallel operations may be performed on the data structure when such operations are being performed on different portions of data within the data structure, for maintaining the integrity of the data on which an operation is being performed while also enabling greater throughput of operations performed on the data structure.

Figure 2:
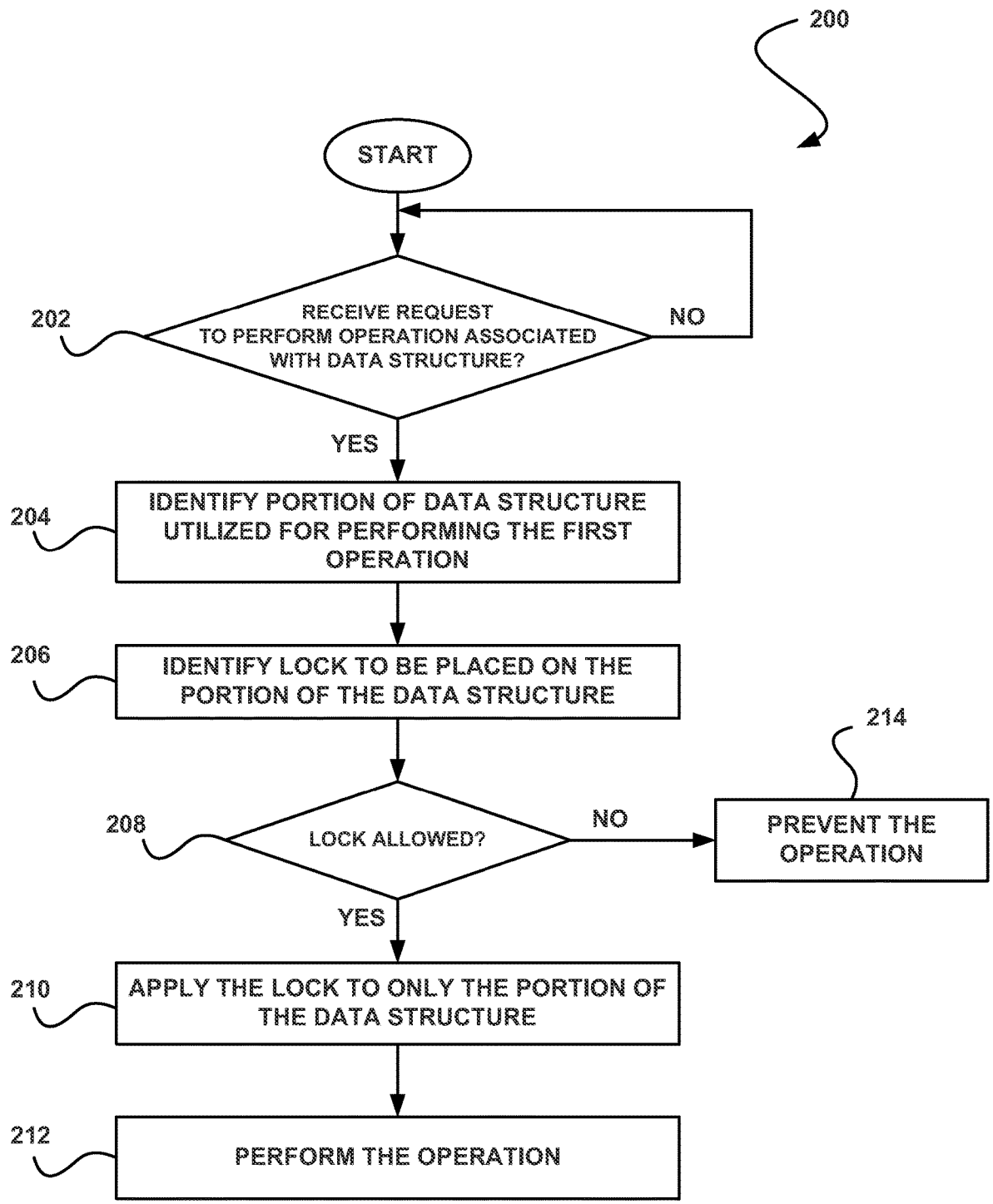
FIG. 2 illustrates a method for applying a lock on data in a data structure for preventing parallel operations on the data, in accordance with an embodiment.

FIG. 2 illustrates a method 200 for applying a lock on data in a data structure for preventing parallel operations on the data, in accordance with an embodiment. As an option, the method 200 may be carried out in the context of the architecture and environment of FIG. 1. Of course, however, the method 200 may be carried out in any desired environment.

As shown in decision 202, it is determined whether a request to perform an operation associated with a data structure is received. In one embodiment, the operation may include modifying a portion of the data structure. In another embodiment, the operation may include applying a lock to a portion of the data structure.

If it is determined that that a request to perform an operation associated with a data structure is not received, the method 200 continues to wait for such a request to be received. However, upon receipt of a request to perform an operation associated with a data structure, a portion of the data structure utilized for performing the operation is identified. Note operation 204. In the present embodiment, the portion of the data structure may include any specific data or substructure within the data structure on which the operation is to be performed.

Additionally, a lock to be placed on the portion of the data structure is identified, as shown in operation 206. As noted above, the operation may include placing the lock on the portion of the data structure, such that the lock may be placed on the portion of the data structure as a result of performance of the operation. In another embodiment (e.g. where the operation includes modifying data in the portion of the data structure), the lock may be placed on the portion of the data structure prior to or otherwise in conjunction with the operation being performed.

In one embodiment, identifying the lock may include identifying a type of lock to be placed on the portion of the data structure. For example, various types of operations may be predetermined to be associated with different types of locks. Thus, the type of the lock may be determined based on the type of the operation. Table 1 illustrates two types of locks which may be utilized for locking a portion of a data structure. Of course, it should be noted that the locks shown in Table 1 are set forth for illustrative purposed only, and thus should not be construed as limiting in any manner.

Table 1

Shared Lock: lock can be shared by multiple operations at the same time, so long as the lock is used at the same time by the multiple operations; may be for use on portions of a data structure where there are not necessarily data corruption concerns associated with performance of operations in parallel Exclusive Lock: lock cannot be shared among operations; may be for use on portions of a data structure with data corruption concerns associated with performance of operations in parallel In another embodiment, identifying the lock may include identifying a specific lock from a pool of locks. For example, a plurality of locks (including shared and exclusive locks) may be provided for use (e.g. by a particular tenant of a multi-tenant on-demand database service), where each lock has a different unique name. In this way, identifying the lock may include identifying the name of the lock. As an option, various operations may be predetermined to be associated with different specific locks within the pool. Thus, the specific lock may be determined based on the operation.

Furthermore, as shown in operation 208, it is determined whether the lock to be placed on the portion of the data structure is allowed. In one embodiment, the determination may be based on whether the lock is currently in use by another operation. For example, where the specific lock is determined from the pool of locks, as described above, it may be determined that the specific lock is allowed if the specific lock is not already placed on any portion of the data structure. Similarly, it may be determined that the specific lock is not allowed if the specific lock is already placed on any portion of the data structure.

In another embodiment (e.g. where the specific lock is not already placed on any portion of the data structure), the determination may be based on whether another lock that is already in place or that is to be placed on the portion of the data structure prohibits the placement of the lock identified in operation 206. Thus, the allowability of the lock may be determined based on rules associated with locks. For example, if no other lock is currently placed on the portion of the data structure, it may be determined that the lock is allowed.

As another example, if the lock to be placed on the portion of the data structure is a shared lock, it may be determined that that the shared lock is allowed to be placed on the portion of the data structure if another shared lock is already placed on the portion of the data structure, such that the shared locks are placed on the portion of the data structure concurrently. As yet another example, if the lock to be placed on the portion of the data structure is either of a shared lock or exclusive lock, it may be determined that that the shared lock/exclusive lock is not allowed to be placed on the portion of the data structure if an exclusive lock is already placed on the portion of the data structure.

As shown, if it is determined that the lock is allowed, the lock is applied to only the portion of the data structure utilized for performing the first operation. Note operation 210. Thus, subsequent locks attempted to be placed on the portion of the data structure in association with other operations (which are subsequently requested and which utilize the portion of the data structure) may be conditionally blocked in accordance with the embodiments described above.

Furthermore, the operation is performed, as shown in operation 212. Optionally, upon completion of the operation, the lock may be removed from the portion of the data. If, however, it is determined in decision 208 that the lock is not allowed, the operation requested to be performed in association with the data structure is prevented. Note operation 214. For example, in the present embodiment, the operation may be blocked.

Figure 3:
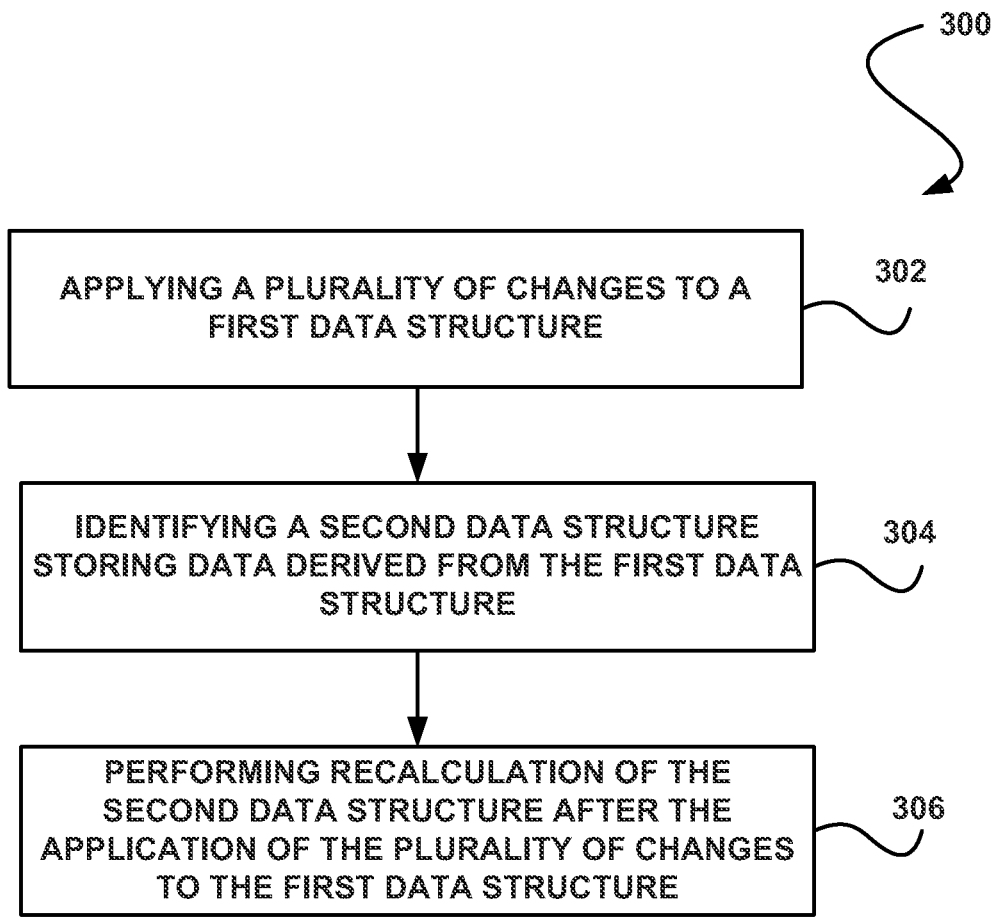
FIG. 3 illustrates a method for maintaining data stored in a data structure by recalculating a data structure storing data derived from another data structure after a plurality of updates to the other data structure, in accordance with an embodiment.

FIG. 3 illustrates a method 300 for maintaining data stored in a data structure by recalculating a data structure storing data derived from another data structure after a plurality of updates to the other data structure, in accordance with an embodiment. As an option, the method 300 may be carried out in the context of the architecture and environment of FIGS. 1-2. For example, the updates to the other data structure may be made in accordance with the method 100 of FIG. 1. Of course, however, the method 300 may be carried out in any desired environment.

As shown in operation 302, a plurality of changes is applied to a first data structure. With respect to the present embodiment, the changes may include any modifications to data stored in the first data structure. For example, the changes may include updates, deletions, insertions, etc. applied to the first data structure.

In one embodiment, the first data structure may store policies. Each policy may be a statement linking subsets of different data. For example, the policies may include a first set of statements indicating members of each of a plurality of groups and a second set of statements indicating content accessible to each of the plurality of groups.

Additionally, as shown in operation 304, a second data structure storing data derived from the first data structure is identified. With respect to the present embodiment, the second data structure may include any data structure that is separate from the first data structure and which stores data derived from the first data structure. Such data may be derived from the first data structure by being calculated in dependence upon data stored in the first data structure.

For example, where the first data structure stores policies, as described above, the data stored in the second data structure that is derived from the first data structure may include a result of an evaluation of the policies. As another example, where the first data structure stores the exemplary policies noted above, the data stored in the second data structure that is derived from the first data structure may include a determination of content that is accessible to each of the members via membership of the member in at least one of the groups.

Just by way of illustration, policy A1 stored in the first data structure may include a statement that user A is a member of Group A. Additionally, policy A2 stored in the first data structure may include a statement that Group A is allowed to access content A. Accordingly, the data stored in the second data structure that is derived from the first data structure may include a result of an evaluation of policy A1 and policy A2. In the present example, such result stored in the second data structure may include a statement that user A is allowed to access content A (e.g. by virtue of the membership of user A in Group A and the permission given to Group A to access content A).

Still yet, as shown in operation 306, recalculation of the second data structure is performed after the application of the plurality of changes to the first data structure. It should be noted that the recalculation may include any operation performed with respect to the second data structure whereby the data stored in the second data structure is re-derived based on the data stored in the first data structure. For example, the recalculation of the second data structure may include re-evaluating data stored in the first data structure and storing a result of the reevaluation in the second data structure. With respect to the above described embodiment where the first data structure stores policies indicating group membership and content accessible to various groups, the data stored in the second data structure may be recalculated from the data stored in the first data structure by determining, based on the policies, content that is accessible to each of the members. Accordingly, where multiple changes have been made to the first data structure, as described above, the recalculation may take into account such changes, such that the data stored in the second data structure as a result of the recalculation may reflect the changes.

By recalculating the second data structure only after the application of the plurality of changes to the first data structure, the second data structure may only be recalculated after a group of changes have been made to the first data structure, thus separating the changes made to the first data structure from changes made to the second data structure. For example, the recalculation may be performed after the plurality of changes to the first data structure such that recalculation of the second data structure after each of the plurality of changes to the first data structure is avoided. Deferring the recalculation of the second data structure in the manner described above may reduce the amount of resources utilized by reducing a number of times the second data structure is recalculated.

Figure 4:
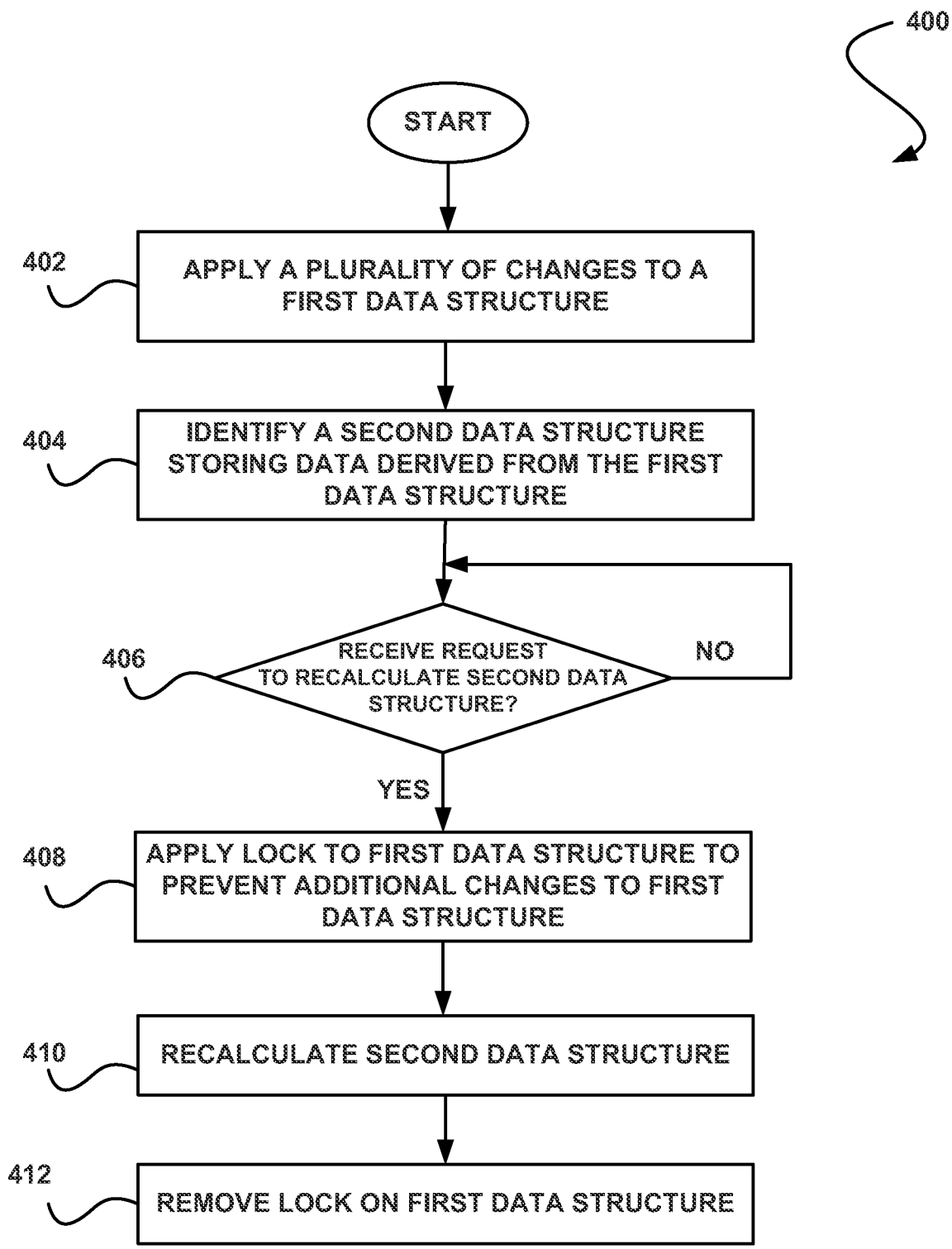
FIG. 4 illustrates a method for applying a lock to a data structure during recalculating of the data structure, in accordance with an embodiment.

FIG. 4 illustrates a method 400 for applying a lock to a data structure during recalculating of the data structure, in accordance with another embodiment. As an option, the method 400 may be carried out in the context of the architecture and environment of FIGS. 1-3. Of course, however, the method 400 may be carried out in any desired environment.

As shown in operation 402, a plurality of changes is applied to a first data structure. Just by way of example, the changes may include updating a statement indicating which members are in a particular group, removing a group's permission to access a particular piece of content, etc. It should be noted that the changes may occur in conjunction with one another (e.g. may be dependent upon one another), or may be separate from one another. Furthermore, the changes may occur over any period of time, such as a predetermined period of time.

In one embodiment, the changes may be grouped over a particular period of time. For example, the changes may be stored in a queue prior to be made to the first data structure. Thus, upon the termination of the particular period of time, the changes may be made to the first data structure in sequence (e.g. and thus in a short period of time).

Additionally, a second data structure storing data derived from the first data structure is identified, as shown in operation 404. For example, the second data structure may store evaluations of the statements stored in the first data structure. Further, it is determined whether a request to recalculate the second data structure is received. Note decision 406.

In one embodiment, the request may be made periodically (e.g. at a predefined interval, at a predetermined time, etc.). In another embodiment, the request may be issued manually. If it is determined that a request to recalculate the second data structure has not been received, the method 400 continues to wait for such a request to be received.

However, in response to receipt of a request to recalculate the second data structure, a lock is applied to the first data structure to prevent additional changes to the first data structure. Note operation 408. In particular, the lock may prevent any changes from being made to the first data structure while the lock is held on the first data structure. Such lock may be utilized to ensure data integrity of the first data structure and the second data structure during recalculation of the second data structure (described below).

Still yet, the second data structure is recalculated, as shown in operation 410. Since the recalculation is performed after the application of the plurality of changes to the first data structure, the recalculation may serve to update the second data structure to reflect the changes made to the first data structure. Moreover, the lock on the first data structure is removed, as shown in operation 412. In this way, further changes may be made to the first data structure (e.g. and the second data structure recalculated again via the method 400 described above).

Figure 5:
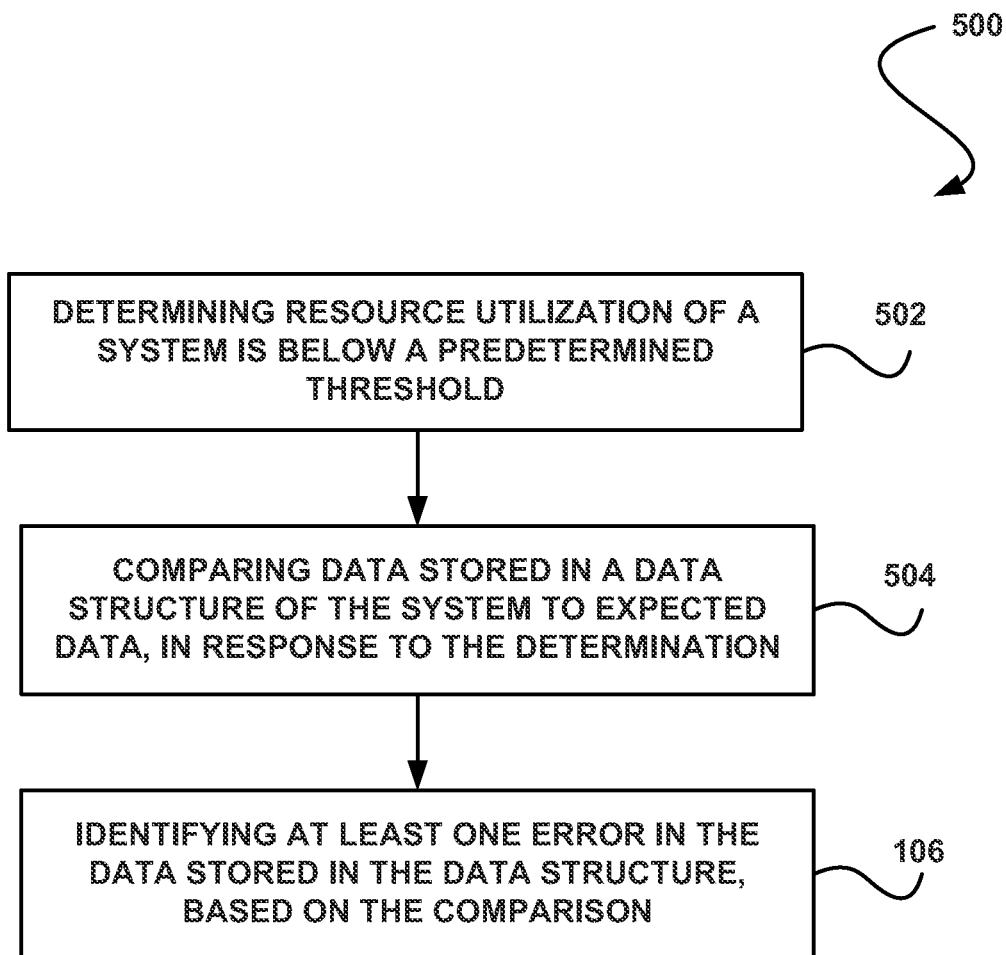
FIG. 5 illustrates a method for maintaining data stored in a data structure by identifying errors in data stored in the data structure, in accordance with an embodiment.

FIG. 5 illustrates a method 500 for maintaining data stored in a data structure by identifying errors in data stored in the data structure, in accordance with another embodiment. As an option, the method 500 may be carried out in the context of the architecture and environment of FIGS. 1-4. For example, the method 500 may be carried out in response to the recalculation of the data described in the method 300 of FIG. 3. Of course, however, the method 500 may be carried out in any desired environment.

As shown in operation 502, resource utilization of a system is determined to be below a predetermined threshold. In the present embodiment, the resource utilization may include any use of (e.g. load on) a resource of the system, where the system may include a server, etc. For example, the resource may include a data structure, processor [e.g. central processing unit (CPU)], etc.

Further, data stored in a data structure of the system is compared to expected data, in response to the determination. Note operation 504. Accordingly, the comparison may only be performed in response to the determination that the resource utilization of the system is below the predetermined threshold. Thus, it should be noted that the resource utilization of the system may be monitored for making the aforementioned determination, and that as a result of such monitoring the comparison may also be terminated in response to a subsequent determination that the resource utilization of the system is above the predetermined threshold.

In one embodiment, the expected data may include data which is expected to be present in the data structure as a result of at least one change made to the data structure. For example, the data stored in the data structure may be changed as a result of at least one operation performed on the data, and the expected data may include resultant data expected from the performance of the at least one operation on the data. To this end, the expected data may be compared to the actual data stored in the data structure.

In one example, if all rows of the data structure are expected to not have an access level of READ due to a default READ permission placed with respect to all of the rows, then the expected data may include rows of the data structure not having a field indicating an access level of READ. To perform the aforementioned comparison with respect to the present example, the data structure may be queried to find all rows indicating an access level of READ, where such rows are the actual data in the data structure. Of course, it should be noted that the comparison may be performed in any desired manner.

Still yet, as shown in operation 506, at least one error in the data stored in the data structure is identified, based on the comparison. For example, in the present embodiment, the error may be identified in response to the comparison indicating that the expected data is different from the data stored in the data structure. Similarly, if the actual data matches the expected data, as determined based on the comparison, an error may not necessarily be identified.

To this end, errors in the data structure of the system may be identified only when the resource utilization of the system is below the predetermined threshold. This may prevent the identification of errors, and thus the consumption of resources to identify such errors, from impacting other operations of the system. Furthermore, by automatically performing the comparison to identify the errors when the resource utilization of the system is below the predetermined threshold, the errors may be identified proactively, and thus prior to an administrator or any other user of the data structure noticing the errors.

Figure 6:
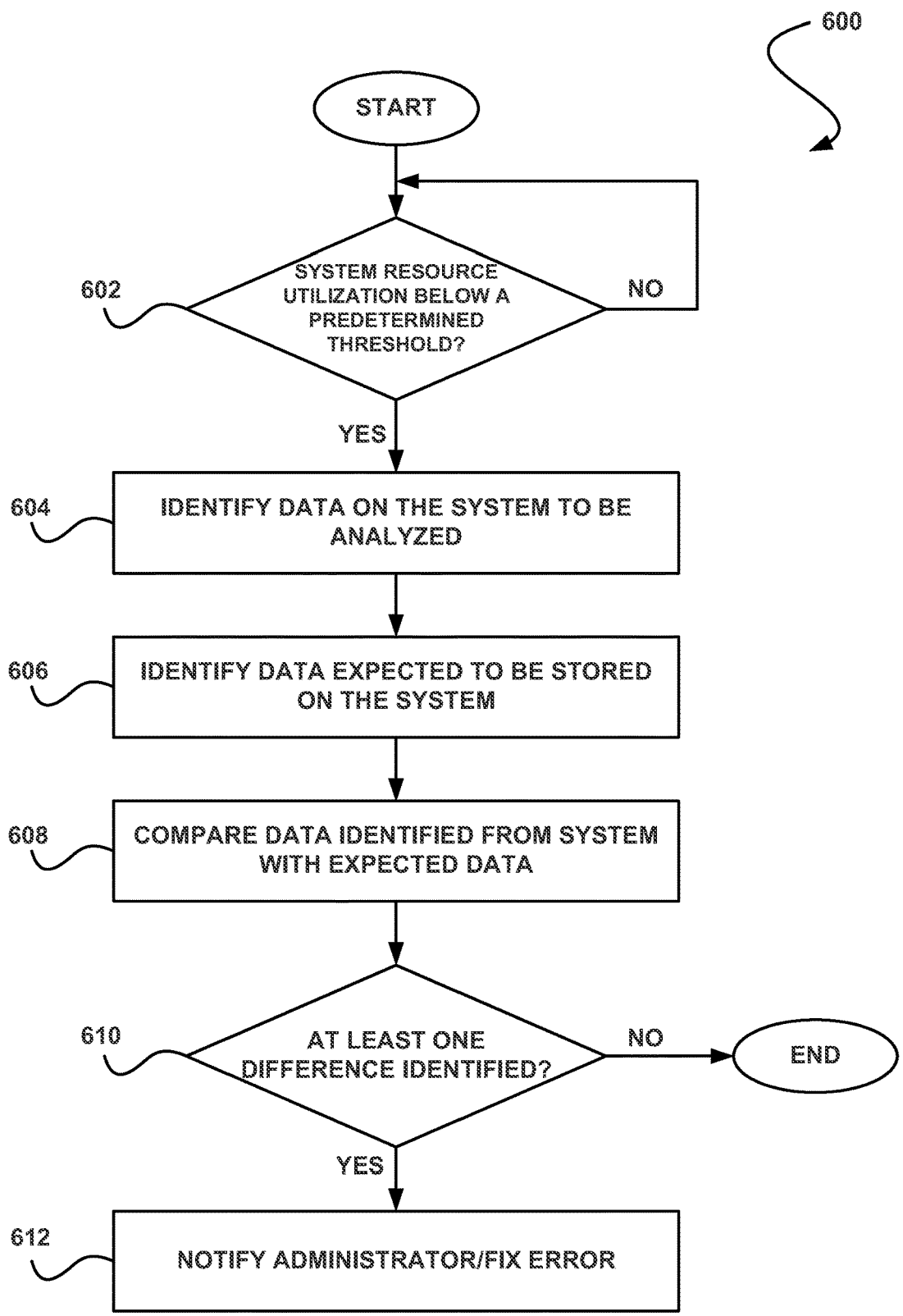
FIG. 6 illustrates a method for identifying differences between data stored in a data structure and data expected to be stored in the data structure, in accordance with an embodiment.

FIG. 6 illustrates a method 600 for identifying differences between data stored in a data structure and data expected to be stored in the data structure, in accordance with an embodiment. As an option, the method 600 may be carried out in the context of the architecture and environment of FIGS. 1-5. Of course, however, the method 600 may be carried out in any desired environment.

It should be noted that the present method 600 may be carried out separately for each customer of a multi-tenant on-demand database system (as described below with reference to FIGS. 7 and 8). For example, the present method 600 may be utilized to identify differences between data stored by the multi-tenant on-demand database system for the customer and data expected to be stored for such customer. Accordingly, the method 600 may be repeated in a round robin manner for each of a plurality of customers of the multi-tenant on-demand database system. By implementing the method 600 for a single customer at a time, and thus a limited set of data at a time (instead of a data set for an entire database partition holding data for multiple customers), system resource utilization to perform the method 600 may be limited, thus reducing any adverse effect on customer operations.

As shown in decision 602, it is determined whether utilization of a resource of a system is below a predetermined threshold. The determination may be made with respect to a single resource, or optionally a plurality of resources of the system. If it is determined that the system resource utilization is not below the predetermined threshold, the method 600 continues to wait for a determination that the system resource utilization is below the predetermined threshold.

However, once it is determined that the system resource utilization is below the predetermined threshold, data on the system that is to be analyzed is identified. Note operation 604. In one embodiment, the data may include data which has been changed. In another embodiment, the data may include data within a data structure. More information regarding the analysis to be performed is described below with reference to the comparison of the data to expected data.

Additionally, data expected to be stored on the system is identified, as shown in operation 606. With respect to the present embodiment, the data expected to be stored on the system may include any data expected as a result of a change to the data stored on the system. Just by way of example, if a user is added to a group with access to a particular piece of content, the expected data would be that the user has access to the particular piece of content.

Further, the data identified from the system is compared with the expected data, as shown in operation 608. In the present embodiment, the comparison may determine whether the data identified from the system matches the expected data. If it is determined that the data identified from the system matches the expected data, the method 600 is terminated. Specifically, such a determination may indicate that any change made to the data had an expected result (e.g. that the change was implemented as expected).

If, however, it is determined that the data identified from the system does not match the expected data, an administrator is notified and the error is fixed. Note operation 612. For example, in the present embodiment, a determination that the data identified from the system does not match the expected data may indicate that any change made to the data had an unexpected result (e.g. that the change was not necessarily implemented as expected).

It should be noted that the notification sent to the administrator may include any information indicating that the data on the system is not as expected. For example, the notification may generally indicate that that the data on the system is not as expected (for allowing the administrator to manually determine a source of the unexpected data). Of course, as another option, the notification may include a specific reference to a portion of the data that is unexpected (i.e. the error), which may be determined as described below.

Furthermore, as noted above, the error is fixed. In one embodiment, each change made to the data may be logged in a change log. For example, a time of the change, a type of the change, the specific data that was changed, etc. may be logged. In addition, each execution of the method 600 may be logged in an execution log, including a time of such execution.

Thus, if unexpected data is found as a result of a particular execution, all changes made between that execution and the execution immediately prior may be identified from the aforementioned change log (e.g. based on the times of the changes included in the change log that are between the time of the latest execution and the immediately prior execution included in the execution log). The identified changes may then be analyzed to determine which one resulted in the unexpected data, and the error may be fixed based on the change that was determined to be the source of the error. To this end, identified errors may be corrected. Moreover, the method 600 may be repeated with respect to the same data, in response to the correction of the errors, for validating that the errors were corrected.

System Overview

Figure 7:
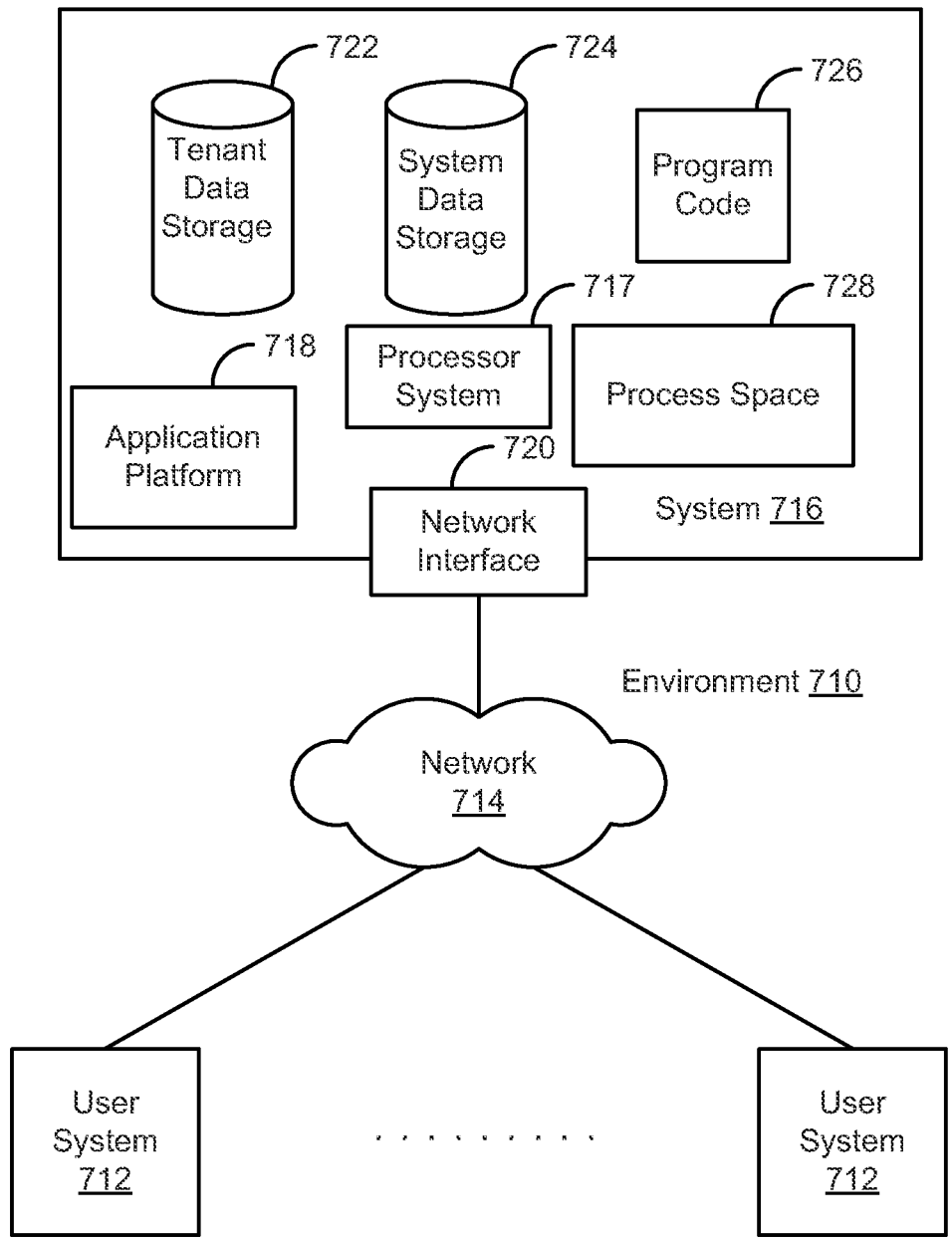
FIG. 7 illustrates a block diagram of an example of an environment wherein an on-demand database service might be used.

FIG. 7 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server"

are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
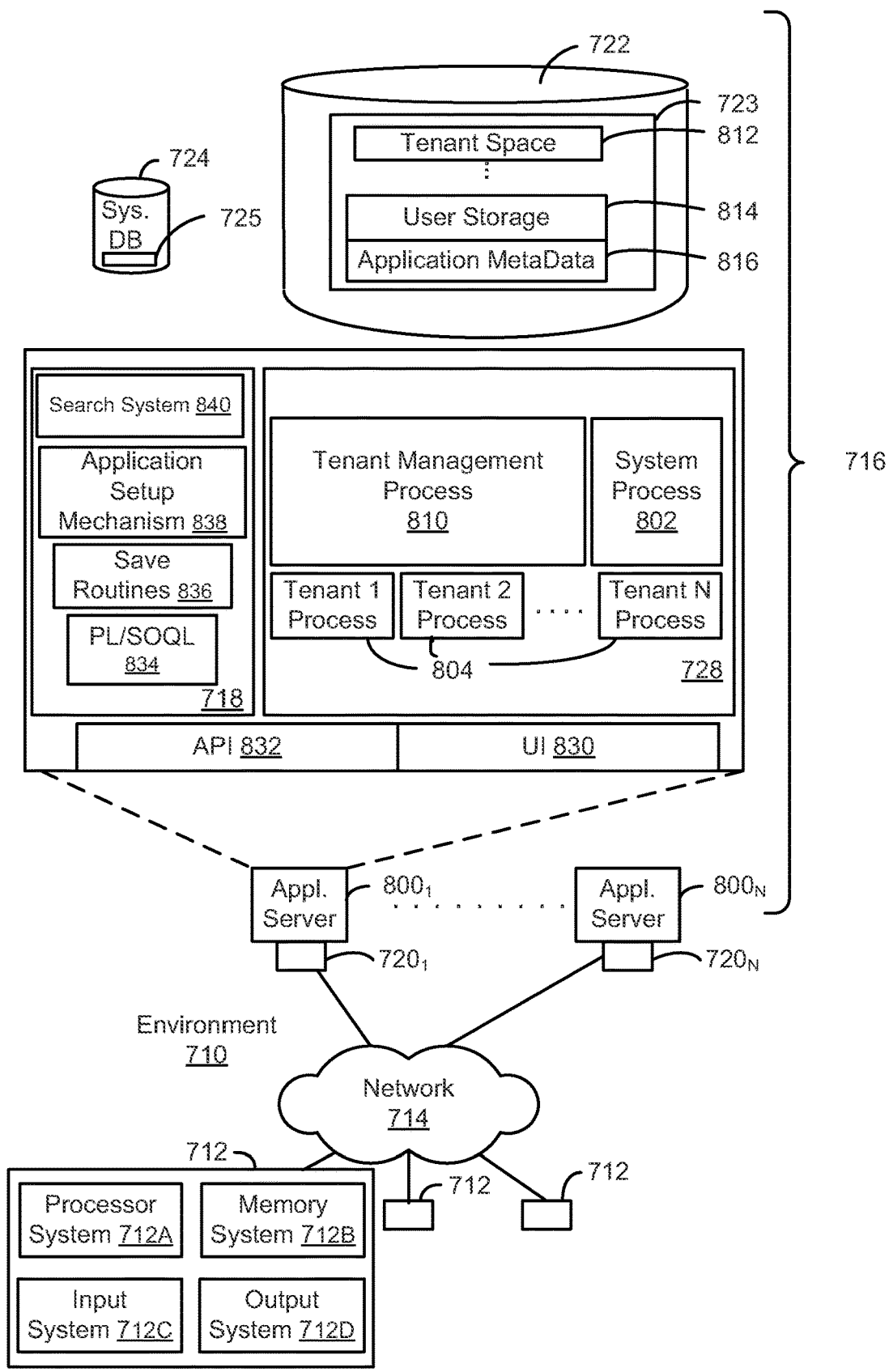
FIG. 8 illustrates a block diagram of an embodiment of elements of FIG. 7 and various possible interconnections between these elements.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $800_1$-$800_N$, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PU/SOQL 834 that provides a programming language style interface extension to API 832. A detailed description of some PL/SOQL language embodiments is discussed in commonly owned U.S. Provisional Patent Application 60/828,192 entitled. PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A non-transitory computer-readable medium having program instructions stored thereon that are capable of causing a computer system to perform operations comprising:
　　receiving a request to perform an operation on a portion of content included in a first database object of the computer system;
　　identifying a substructure of the first database object that stores the portion of content;
　　identifying a type of lock to place on the substructure based on a type of the operation; and
　　performing the operation on the portion of content, wherein the performing includes:
　　　　determining whether a lock has already been placed on the substructure; and
　　　　in response to determining that no lock has been placed on the substructure, obtaining, based on the identified type of lock, a lock on the substructure to block, during performance of the operation, a different operation's access to the portion while permitting access to remaining portions of the content included in the first database object.

2. The medium of claim 1, wherein the operations further comprise:
　　after performing the operation:
　　　　making a determination that a resource utilization of the computer system satisfies a defined threshold; and
　　　　in response to the determination, verifying that data included in the portion of the content corresponds to expected data.

3. The medium of claim 2, wherein the operation includes updating the data of the portion to add a user to a group that has access to a specified item, wherein the verifying includes determining whether the user has access to the specified item to which the group has access.

4. The medium of claim 2, wherein the first database object is associated with a set of tenants, and wherein the verifying is performed on one tenant of the set of tenants at a time.

5. The medium of claim 1, wherein the operation includes applying a change to data included in the portion, and wherein the operations further comprise:
　　after performing the operation, generating evaluated data derived from the data included in the portion of the content of the first database object; and
　　storing the evaluated data in a second database object.

6. The medium of claim 5, wherein generating the evaluated data include obtaining a lock on the first database object and a lock on the second database object.

7. The medium of claim 1, wherein the content of the first database object includes a plurality of records respectively associated with a plurality of tenants of a multi-tenant database service, and wherein a given tenant is prevented from accessing records associated with other ones of the plurality of tenants.

8. A method, comprising:
　　receiving, by a computer system, a first request to perform an operation on a first portion of content included in a first database object;

identifying, by the computer system, a substructure of the first database object that stores the first portion of content;

performing, by the computer system, the operation on the first portion of the content, wherein the performing includes:

determining whether a lock has already been placed on the substructure; and in response to determining that no lock has been placed on the substructure, obtaining a lock on the substructure to block, during performance of the operation, a different operation's access to the first portion while permitting access to remaining portions of the content included in the first database object.

9. The method of claim 8, wherein the operation includes applying a change to data of the first portion, and wherein the method further comprises:

after performing the operation, the computer system performing a reevaluation of the first database object; and storing, by the computer system, a result of the reevaluation in a second database object that stores data derived from the content included in the first database object.

10. The method of claim 9, wherein the content of the first database object includes first and second sets of statements, wherein the result of the reevaluation includes a statement that is an aggregation of a first statement in the first set of statements and a second statement in the second set of statements.

11. The method of claim 8, further comprising:

verifying, by the computer system, that data of the first portion corresponds to expected data, wherein the verifying is performed dependent upon determining that a resource utilization of the computer system is below a threshold.

12. The method of claim 11, wherein the operation includes updating the data of the first portion to add a user to a group that has access to a specified item, wherein the verifying includes determining whether the user has access to the specified item to which the group has access.

13. The method of claim 8, further comprising:

identifying, by the computer system, a type of lock to place on the substructure based on a type of the operation, wherein the lock obtained on the substructure is an exclusive lock.

14. The method of claim 8, further comprising:

receiving, by a computer system, a second request to perform an operation on a second portion of content included in a first database object; and performing, by the computer system, the operation of the second request on the second portion of the content, wherein the performing of the operation of the second request includes:

obtaining a shard lock on another substructure that includes the second portion, wherein the shared lock permits other shared locks to be obtained on the other substructure that includes the second portion.

15. A non-transitory computer-readable medium having program instructions stored thereon that are capable of causing a computer system to perform operations comprising:

storing first content in a first database object and second content in a second database object of the computer system, wherein the second content is derived from the first content;

applying a set of changes to a portion of the first content of the first database object; and in response to applying the set of changes, generating reevaluated second content that reflects the set of changes applied to the portion of the first content, wherein the generating of the reevaluated second content includes blocking a different operation's access to the portion of the first content while permitting access to remaining portions of the first content.

16. The medium of claim 15, wherein the operations further comprise:

storing, over a particular period of time, changes in a queue that are to be applied to the first database object, wherein the set of changes corresponds to changes that were stored over the particular period of time.

17. The medium of claim 15, wherein the operations further comprise:

determining that a resource utilization of the computer system satisfies a threshold; and in response to the determining, performing error detection on the first content included in the first database object.

18. The medium of claim 15, wherein the blocking includes obtaining a lock on the portion of the first content, wherein the lock obtained on the portion is an exclusive lock.

19. The medium of claim 18, wherein a type of the lock obtained on the portion of the first content is based on a type of the operation.

20. The medium of claim 15, wherein the first content includes first and second sets of statements, wherein the second content includes a statement that is an aggregation of a first statement in the first set of statements and a second statement in the second set of statements.

* * * * *